United States Patent Office 3,549,245
Patented Dec. 22, 1970

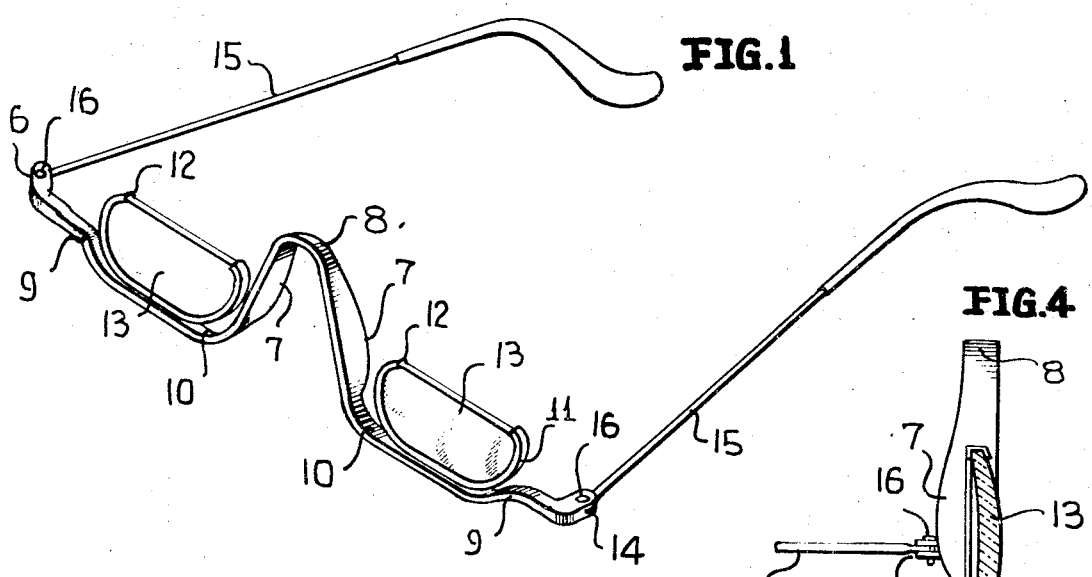
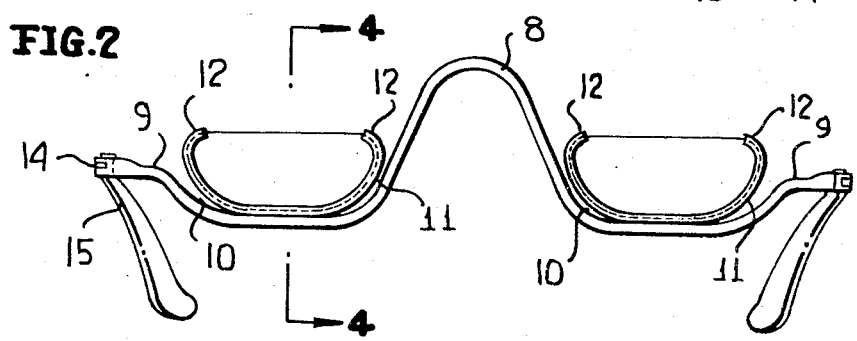
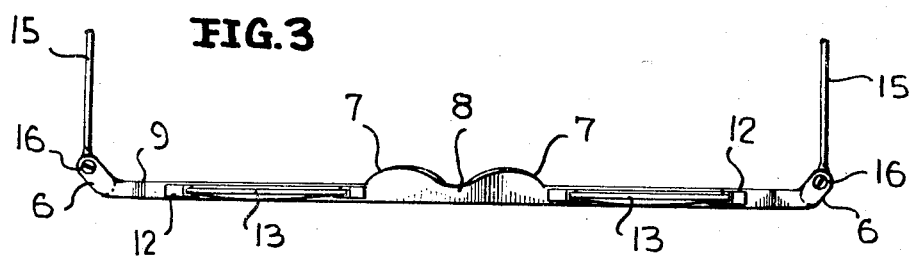
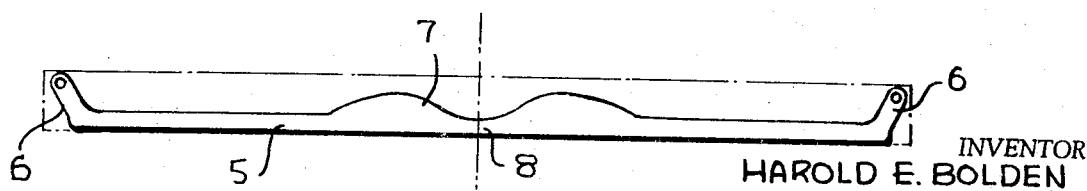

1

3,549,245
SPECTACLES HAVING RESILIENT LENS RIMS
Harold E. Bolden, 2906 Maple Road,
Rome, Ga. 30161
Filed Dec. 3, 1968, Ser. No. 780,716
Int. Cl. G02c 1/04
U.S. Cl. 351—61                                 2 Claims

ABSTRACT OF THE DISCLOSURE

A spectacle frame specifically designed for use by surgeons wherein semi-elliptical lenses are mounted in a frame at a level so as not to obstruct the vision of the surgeon when using a microscope. The spectacle frame is formed from one piece of material bent intermediate its ends to form a nose bridge with integral nose pads on opposite sides of the bridge and having its ends bent to form recesses to receive resilient lens rims which hold the lenses in position without covering the upper edge of the lenses.

---

It is an object of the invention to provide a spectacle frame for mounting semi-elliptical lenses at a low level with the upper edge uncovered so as not to obstruct the vision when using a microscope.

A further object resides in providing a resilient frame for supporting the lenses having its ends bent over the upper edge of the lenses to firmly and releasably hold the lenses in place.

Another object of the invention resides in providing a spectacle frame formed from one piece of material bent intermediate its ends to form a nose bridge with nose pads on each side of the bridge and its ends bent to provide a recesses to receive and support lens rims.

Other objects and advantages of the invention will be apparent during the course of the following description.

In the accompanying drawing forming a part of this specification and in which like numerals are employed to designate like parts throughout the same, FIG. 1 is a perspective view of the spectacle frame.
FIG. 2 is a front view of the same,
FIG. 3 is a top view of the same,
FIG. 4 is a section taken on line 4—4 of FIG. 2, and,
FIG. 5 is a view of the blank material from which the frame is formed.

Referring to the drawing, FIG. 5, the spectacle frame is formed from a straight bar 5 of suitable material having angular bent ends 6 and curved projections 7 along its inner edge on opposite sides of the middle portion of the bar. The bar is bent intermediate its ends to form a nose bridge 8 with the projections 7, in opposed relation, forming nose pads to support the frame on the nose of the wearer. The ends of the bar are bent upwardly, as at 9, defining recesses 10 to receive the resilient lens holding rims 11. The rims 11 are formed of channeled metal

2 fixedly secured intermediate its ends to the center of the recesses by soldering. The free ends of the rims 11 are slightly curved inwardly, as at 12, to resiliently engage over the upper edge of the semi-elliptical lenses 13 seated in the frame to firmly secure the lenses in the frame. The ends 6 of the bar 5 are bifurcated, as at 14 to receive the temples 15 which are pivotally mounted in the bifurcations by screws 16.

The low slung recesses supporting the lens rims positions the lenses in a low position in front of the eyes so as not to interfere with the vision of the surgeon when it is necessary to use a microscope. The resilient lens rims firmly secures the lens in position without covering the upper edge of the lens so that the wearer has a clear view through or over the lens. The outstanding features of the invention are a frame having an integral nose bridge and nose pads and recesses for supporting resilient lens holding rims to geometrically position the lens in relationship to the eyepiece of a microscope and face mask worn by a surgeon.

Having thus described my invention, I claim:

1. A spectacle frame comprising a bar bent upwardly intermediate its ends to for ma V-shape nose bridge, the side members of said bridge being wider than said bar to provide parallel nose pads, said bar having its ends bent upwardly forming recesses between the ends and said nose bridge, arcuate lens rims formed of resilient material seated in said recesses and fixedly secured to said bar with the ends of said rims being freely movable, said rims being U-shape in cross section forming a groove along the inner periphery of the rims and a semi-elliptical lens fitted in the groove of each said rim with the ends of each rim being bent to resiliently engage over the upper edge of said lens to removably hold the lens in said rims.

2. A spectacle frame as described in claim 1 wherein the ends of said bar are bifurcated and temples are pivotally mounted in the bifurcations.

References Cited

UNITED STATES PATENTS

| | | | |
|---|---|---|---|
| 2,844,071 | 7/1958 | Schumacher | 351—106 |
| 2,880,649 | 4/1959 | Eisler | 351—61 |
| 3,471,222 | 10/1969 | Eisler | 351—61 |

FOREIGN PATENTS

| | | | |
|---|---|---|---|
| 524,187 | 4/1956 | Canada | 351—103 |
| 549,198 | 11/1942 | Great Britain | 351—61 |

DAVID SCHONBERG, Primary Examiner

JOHN W. LEONARD, Assistant Examiner

U.S. Cl. X.R.

351—106